United States Patent Office 3,094,556
Patented June 18, 1963

3,094,556
CARBOXYLATED BICYCLOHEPTENE
COMPOUNDS
Herbert K. Wiese, Cranford, and Fred W. Banes, Westfield, N.J., assignors to Esso Research and Engineering Company, a corporation of Delaware
No Drawing. Filed Dec. 30, 1957, Ser. No. 705,734
3 Claims. (Cl. 260—514)

The present invention relates to polyfunctional acid derivatives of cyclodiene carboxylic acids and to their preparation. More particularly, the invention relates to polyfunctional adducts such as the bicycloheptene carboxylic acids, anhydrides and the corresponding lactones obtained by reacting dicyclopentadiene dicarboxylic acid or the like with maleic anhydride, aconitic acid or other dienophilic carboxylic compounds. This is a continuation-in-part of our copending application Serial No. 498,750 filed April 1, 1955, now abandoned.

The terms "dienophile" and "dienophilic compound" are used herein to designate a compound selected from a group consisting of ethylenically unsaturated aliphatic carboxylic acids and the esters and anhydrides thereof which add dienes with great readiness.

The terms "carboxy" and "carboxyl" are used herein to designate a —COOH group.

The term "lactone" is used herein to designate an anhydro-ring compound produced by intramolecular condensation of an oxy acid with the elimination of water.

In the prior art certain derivatives of cyclopentadiene monocarboxylic acid have been prepared through what has become known as the Diels-Alder type reaction by esterifying the dicyclopentadiene dicarboxylic acid, cracking the dimer ester, reacting the ester of the cyclopentadiene monocarboxylic acid with a dienophile and hydrolyzing the resulting product. The many steps of this process result from an inability of the art to isolate the cyclopentadiene monocarboxylic acid. Low yields characterize this reaction and are probably due to the formation of resins.

Now a process has been discovered whereby the free dicyclopentadiene dicarboxylic acid is reacted directly with a dienophile. This process not only makes possible the elimination of the steps of esterification and ester cracking but also makes possible the creation of certain new products not obtainable through the processes known to the prior art.

Dicyclodiene dicarboxylic acids and their preparation have been described previously in the copending application of Cohen et al., Serial No. 268,122, filed January 24, 1952, issued as Patent No. 2,716,662, reissued as Reissue Patent No. 24,123, which describes present views on the structure of these acids. Such acids are in effect dimers of the corresponding monocyclodiene monocarboxylic acids. These dimer acids are known to depolymerize when heated, but such depolymerization is normally accompanied by undesirable decarboxyliation and resinification. While the monomer acid cannot be isolated as such, it has now been discovered that stable derivatives of monomeric cyclodiene carboxylic acids can be derived by cracking the dimer acids in the presence of suitable dienophilic acid compounds to form adducts. More specifically, it has been found that while the equilibrium of the mixture resulting from the depolymerization of the dimer acids heavily favors the dibasic acid dimer, the monomer acid present will form stable acid derivatives by combining with added dienophilic compounds such as maleic anhydride and aconitic acid. When esterified with alcohols such as butyl or octyl alcohol, or with ethylene glycol or the like, the various novel polybasic compounds yield esters which, depending on the degree of cross-linking and other properties, can be used as plasticizers, additives for lubricating oils and greases, alkyd-type resins, and in making agricultural chemicals. Polyurethane plastics can be formed by reacting the resulting polyester resins with polyisocyanates such as meta-toluene diisocyanate.

In carrying out the present invention, the principal reagent is a dicyclodiene dicarboxylic acid such as dicyclopentadiene dicarboxylic acid which may be represented by the formula:

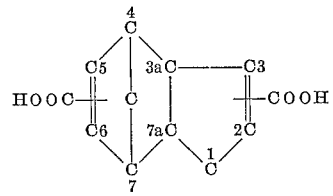

In this formula, as in all structural formulas used hereinafter, it is understood that all carbon valences not shown here are satisfied by the groups illustrated such as the carboxyl groups in the foregoing formula and by hydrogen atoms.

In operating this invention, one may also use the homologs of dicyclopentadiene in which alkyl groups having 1 to 4 carbon atoms are substituted for one or more of the hydrogen atoms attached to the ring carbons. These would include the butyl, propyl, ethyl and methyl homologs of dicyclopentadiene dicarboxylic acid and the various combinations thereof such as dimethyl dicyclopentadiene dicarboxylic acid.

The other essential reagent used in the present invention is a dienophilic unsaturated carboxylic compound selected from a group consisting of $C_3$ to $C_{18}$ ethylenically unsaturated aliphatic carboxylic acids and the esters and anhydrides thereof. In general, it is desirable to use a reaction mixture containing the reagents in stoichiometric proportion, that is, about one mole of unsaturated dienophilic acid or anhydride per half a mole of the dimeric cyclodiene carboxylic acid, since the reaction is normally quantitative. However, if desirable for any particular reason, an excess of one or the other reagent may be present. No catalyst is required.

The desired reaction is carried out satisfactorily by heating the reaction mixture at temperatures sufficiently high to bring about cracking or depolymerization of the dicyclodiene dicarboxylic acid into its monomer. These reaction temperatures are in the range of about 75° to 250° C., the preferred reaction temperature being between about 135° and 190° C. Below about 100° C., the reaction becomes slow due to the low rate of depolymerization and consequent small availability of the monomeric acid reagent, whereas at temperatures above 190° C., decarboxylation of the cyclodiene carboxylic acid and resinification tend to become increasingly prevalent. The pressure depends on the dienophilic acid used and the temperature at which the reaction is carried out. Accordingly, the reaction may be conveniently conducted at pressures ranging from atmospheric or slightly subatmospheric to moderately elevated pressures such as 10 to 50 p.s.i.g. The reaction is a rapid one and can normally be completed in 5 to 60 minutes. As a result, the reaction can be carried out either batchwise or in a continuous manner.

The reaction of the present invention may be represented by the following equation:

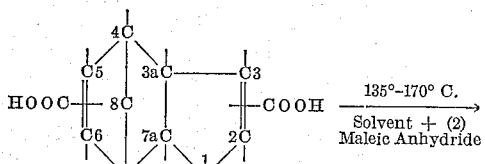

Dicyclopentadiene dicarboxylic acid

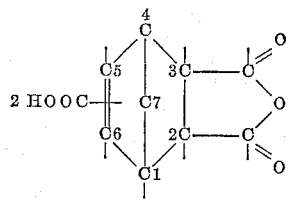

bicyclo-(2,2,1)-5-heptene-x-carboxy-2,3 dicarboxylic anhydride, wherein x is a carbon in the ring containing carbons of the 1, 4, 5, 6 and 7 positions The reaction temperature is suitably controlled by refluxing a solvent medium such as xylenes, mineral spirits, nonanes, propionic acid, acetic acid, or similar liquids, particularly hydrocarbons or saturated aliphatic acid, which are substantially inert in the reaction mixture and boil in the desired reaction temperature range when under suitable pressure. Usually about 2 to 10 parts of such a liquid are used per part of cyclodiene carboxylic acid. However, the reaction can be carried out without any solvent, using other temperature control means. Nevertheless, the use of the solvent is preferred since it has other beneficial effects, such as giving improved contact between the reagents and increased depolymerization of the dibasic acid. The problem of low yields, characteristic of the prior art, has been successfully met by this process wherein the yields are quantitative as shown hereinafter in column 4.

Various specific examples will now be given as illustrations. It will be understood that all proportions and percentages of materials are expressed throughout on a weight basis in the absence of contrary indications.

EXAMPLE I

Each of five runs was made in an agitated reactor using 55.1 g. (0.25 mole) of the dimer of dicyclopentadiene dicarboxylic acid, 490.0 g. (0.5 mole) of maleic anhydride, and 200 ml. of xylene. The reaction mixture was heated under reflux. After the indicated reaction period at the reaction temperature of 138° C., stirring was stopped and the product separated as a lower layer. The flask and contents were cooled with a cold water bath, the xylene upper layer was decanted from the product layer, and the product layer was stripped free of xylene. Stripping at reduced pressures was preferred in order to avoid overheating the reaction products.

Each of the products freed of solvent was analyzed for a melting point and acid number. A summary is presented in Table I below.

Table I
PREPARATION OF POLYCARBOXYLIC ACIDS

| Run No. | Reaction time at 138° C., min. | Max. stripping temp., ° C. | Melting range, ° C. | Acid No.[a] meq./gm. | Calculated from analytical data, wt. percent | |
|---|---|---|---|---|---|---|
| | | | | | Tribasic Acid anhyd.[b] | Lactone dibasic acid[c] |
| 19 | 3 | 70 | 122–142 | 13.89 | 90 | 10 |
| 24 | 15 | 105 | 124–160 | 14.02 | 92 | 8 |
| 20 | 30 | 100 | 143–174 | 13.60 | 84 | 16 |
| 21 | 90 | 70 | 112–167 | 13.67 | 85 | 15 |
| 30 | 15 | 106 | 117–176 | [d]13.37 | 80 | 20 |

[a] Theoretical for maleic anhydride cyclopentadiene carboxylic acid adduct 14.41 meq./gm.
[b] Calculated from acid number.
[c] Calculated from difference between ester number and acid number
[d] Theoretical molecular weight for composition shown 211.3, found 212.

The product from Run 19 contained some unreacted cyclopentadiene carboxylic acid dimer as determined by a precipitate from a 10 wt. percent solution of the adduct in water. The solubility of dicyclopentadiene dicarboxylic acid in water is 0.32 wt. percent, whereas the reaction products have a high degree of solubility in water. None of the other products from the runs listed gave a precipitate, thus indicating 97% or higher conversion of the dimer acid to the more soluble tribasic acid anhydride and a lactone dibasic acid byproduct.

The structure of the primary product of this reaction, the adduct of monocyclopentadiene moncarboxylic acid and maleic anhydride, is illustrated in the equation given earlier herein. This compound is a derivative of bicycloheptene and may be designated either as an acid or as an anhydride. This anhydride is capable of existing in either the "endo" or "exo" form.

This particular anhydride is a new chemical product. It is one of the new compounds previously referred to in stating that the present invention makes possible the production of products not obtainable through the known process of reacting the esterified form of the acid with a dienophile.

The ratio of "endo" and "exo" isomer is a function of the reaction temperature at which the maleic anhydride and cyclopentadiene carboxylic acid are allowed to react. The higher the temperature, the greater the amount of endo isomer.

The principal impurity is indicated to be a lactone dibasic acid. However, according to acid numbers shown in Table I, generally about 85% or more of the product consists of the tricarboxylic acid anhydride compounds.

The lactone dibasic acid impurity is produced as a result of the presence of a small amount of water in the reaction mixture. The water is generally introduced with either the solvent, maleic anhydride, dicyclopentadiene dicarboxylic acid, or possibly all three. The lactone dibasic acid is only formed from the endo isomer. The reaction of the exo isomer with water, of course, results in converting it into a tricarboxylic acid by hydration of the anhydride group. Such an acid may be thought of in terms of the following structural formula:

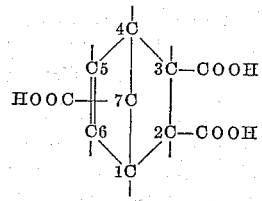

The ease with which the lactone dibasic acid is formed can be demonstrated by taking the maleic anhydride-cyclopendadiene carboxylic acid adduct, dissolving it in hot water, and allowing the water to evaporate off. The solid crystalline residue thus obtained consists of about 67% lactone and 33% tricarboxylic acid. The reaction is demonstrated by the following equation:

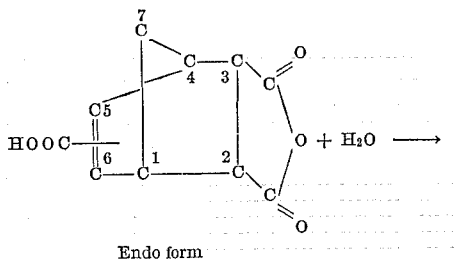

Endo form bicyclo(2,2,1)-5-heptene-$x$-carboxy-2,3 dicarboxylic anhydride, wherein $x$ is a carbon atom selected from the 1, 4, 5 and 6 carbon atoms

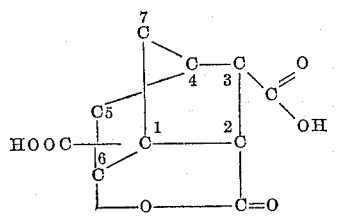

bicyclo(2,2,1)heptane-2,3,)-tricarboxylic acid-6 hydroxy gamma lactone, wherein ) is a carbon atom selected from the 1,4,5 and 6 carbon atoms This dicarboxylic single lactone is another compound whose production has not been taught by the prior art. A dicarboxylic single lactone has been disclosed but it contains an OH group in addition to the carboxyl groupings.

The amount of lactone dibasic acid impurity formed during the preparation of the tricarboxylic acid anhydride depends on the amount of water introduced with the reactants, diluent and/or adsorbed on the walls of the reactor. If the lactone is desired as the end product, the presence of water is necessary. However, it is better to first make the maleic anhydride cyclopentadiene carboxylic acid adduct under essentially anhydrous conditions followed by reacting same with water. Since the maximum yield of lactone obtainable is a function of the amount of endo isomer, it is, of course, desirable to carry out the adduct formation under conditions most suitable for the production of the greatest amount of the endo form.

Tricarboxylic acid anhydride products described in the example were successfully used in preparing alkyd-type resins. For example, 34.7 g. (0.5 equivalent) of the product from Run 24, containing 92% tribasic acid anhydride; 15.5 g. (0.5 equivalent) of ethylene glycol; and 20 mls. of xylene were charged to a stirred reactor. The reaction temperature was raised to 150° C. over a 60-minute period. The reaction mixture was held at 150° C. for 30 minutes, then raised to 190° C. in an additional 30 minutes. The final product representing a quantitative yield on reactants was a hard, brittle resin.

The data obtained in reacting the tribasic acid anhydrides with polyhydroxy compounds indicate that the acids are highly reactive and can be further modified by use of various reagents, such as monohydric alcohols. The tribasic acid anhydrides due to the three carboxyl groups make possible the preparation of highly cross-linked polyester type resins using as coreactants cheap glycols, such as propylene and ethylene glycol, in place of expensive trihydroxy compounds such as glycerol and dibasic acids used presently for the same purpose.

Since the tribasic acid anhydrides are unsaturated, they can be modified by hydrogenation, epoxidation, or halogenation of the double bonds to make further modifications in the products. Also, thiol compounds can be added to the double bonds to give thio ether derivatives. In this manner, it is possible to impart to the products desired, specific properties such as increased chemical stability or reactivity, pesticidal activity, modified solubility, and so forth. Similar modified derivatives are prepared from the homologous alkyl cyclopentadiene dicarboxylic acids, e.g. methylcyclopentadiene, ethyl cyclopentadiene, etc. The empirical formula for the tribasic acid anhydrides of cyclopetadiene is $C_{10}H_8O_5$ and the formula for the tribasic acid anhydride of the homologous series is $C_{10}H_8O_5(CH_2)_n$ wherein $n$ is an integer in the range from 0 to 2 or higher.

EXAMPLE II

In another set of runs, a tetracarboxylic derivative was prepared by reacting dicyclopentadiene dicarboxylic acid with aconitic acid (1,2,3-propene tricarboxylic acid). In each case, a reaction mixture was used containing 55 g. (0.25 mole) of the dimeric cyclodiene carboxylic acid and 87 g. (0.5 mole) of aconitic acid.

The structure of the tetracarboxylic product can be represented by the following formula:

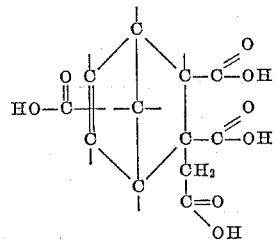

wherein any carbon valences not shown are satisfied by hydrogen atoms or alkyl groups and which may be referred to as a bicyclo-(2,2,1)-5-heptene acetic acid-2,3,$x$ tricarboxy, wherein $x$ is a carbon atom position selected from the 1, 4, 5 and 6 carbon positions.

In the presence of water the bicycloheptene ring becomes hydroxylated. The resulting hydroxyl group then gives rise to a lactone by internal esterification with one of the carboxyl groups.

In one run the reagents were slurried in 250 ml. of straight run mineral spirits and refluxed for 10 minutes at atmospheric pressure and a temperature of 160° C. At the end of the reaction the mineral spirits were stripped off under vacuum and the solid product was recovered.

In the second run the reagents were dissolved in 250 ml. of propionic acid and refluxed for 30 minutes at 140° C. Part of the resulting product was recovered by precipitation with xylene, followed by filtration. The remainder of the product was recovered by vacuum stripping of the propionic acid from the filtrate.

In both of the above runs the recovered product had an acid number of 11.3 and was very hygroscopic. The yield was essentially quantitative as indicated by the fact that the isolated products were completely water soluble. Since the dicyclopentadiene dicarboxylic acid is only slightly soluble in water, any presence of the dicarboxylic acid in the product would be easily detected. According to acid numbers, the products from both runs contained about 75% of the theoretical carboxyl group content. This means that one of the four carboxyl groups of each molecule is tied up as a lactone. However, by careful exclusion of water from the reaction and product workup, this lactone formation can be minimized or prevented. Both the tetracarboxylic acid and its lactone are highly reactive compounds which can be used in making various esters, polyesters and as intermediates in a variety of other organic reactions.

EXAMPLE III

In another test 110 grams (½ mole) of dicyclopentadiene dicarboxylic acid, 174 grams (1 mole) of aconitic acid, and 520 grams (4 moles) of isooctyl alcohol were placed in an agitated reactor vessel. The mixture was heated to a temperature of 130°–140° C. This temperature was maintained for a period of 30 to 45 minutes until the tetracarboxylic acid adduct of cyclopentadiene monocarboxylic acid and aconitic acid is formed. The temperature was then raised to 170°–180° C. to obtain esterification through the reaction of the tetracarboxylic acid and the isooctyl alcohol. After the esterification was consummated, one complete mole of excess alcohol was distilled over, indicating that 100% of the said tetracarboxylic acid was converted to a lactone formation. The water formed is stripped off with the aid of a benzene entrainer. These lactones may be represented by the following structural formulas:

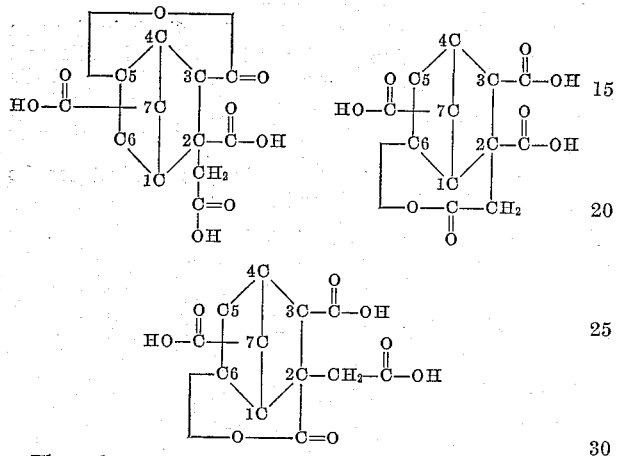

These lactone acids are thought to be novel. By reacting with the isooctyl alcohol the lactone acids shown form the corresponding esters. The resulting tri-isooctyl lactone esters were then tested as plasticizers in a vinyl chloride resin. A commercially used plasticizer (diisooctyl phthalate) was used as a control. The ingredients used for preparing the plasticized resins were as follows:

|  | Grams | Grams |
| --- | --- | --- |
| Geon (vinyl chloride resin) | 150 | 150 |
| Vanstay (oxidation stabilizer) | 3 | 3 |
| DS 207 (Pb Stearate color stabilizer) | 1.5 | 1.5 |
| DIOP (diisooctyl phthalate) | 75 |  |
| Tri-isooctyl ester [1] |  | 75 |

[1] Bicyclo(2,2,1)-5-heptene acetic acid, 2,3,x tricarboxy-tri-isooctyl ester, wherein x is a carbon atom in the ring containing carbons of the 1,4,5,6 and 7 positions.

The plasticized resin was prepared in the conventional manner by mixing the ingredients dry at room temperature and introducing the mixture to a rubber mill kept at 300° F. The amount of ester employed in computing the following data was in the ratio of one part ester to two parts of resin. This ratio may be varied as the final product desired varies within the range of .25 to 2.5 parts of ester to two parts of resin. The corresponding esters of the tricarboxylic acid, bicyclo (2,2,1)-5-heptene-2,3,x-tricarboxylic acid, wherein x is a carbon atom in the ring containing carbons of the 1,4,5,6 and 7 positions, may also be used as plasticizers.

The resulting products were subjected to various standard tests and the following results were obtained:

ORIGINAL TENSILE STRENGTH TEST

|  | (control) |  |
| --- | --- | --- |
| Tensile, p.s.i. | 3,080 | 3,140 |
| Elong., percent | 300 | 310 |

TENSILES AFTER AGING AT 212° F.

| Tensile, p.s.i.: | (control) |  |
| --- | --- | --- |
| After 2 days | 2,630 | 3,050 |
| After 5 days | 2,460 | 3,000 |
| After 7 days | Too brittle to measure. | 2,950 |

PRIMOL D (WHITE OIL) EXTRACTION AT 130° F. FOR 7 DAYS

|  | (control) |  |
| --- | --- | --- |
| Percent Extracted | 9.65 | 3.02 |

TORSIONAL MODULUS

| p.s.i.×10⁻⁵ at: | (complete) |  |
| --- | --- | --- |
| +25° C | 0.022 | 0.086 |
| +10° C | 0.089 | 0.43 |
| −5° C | 0.44 | 1.50 |
| −20° C | 1.50 | 2.92 |
| −50° C | 4.38 | 4.04 |

Furthermore, instead of using ethylenically unsaturated polycarboxylic dienophiles, useful adducts can also be formed by reacting the dimeric cyclodiene carboxylic acid with unsaturated monocarboxylic aliphatic acids of 3 to 18 carbon atoms such as acrylic, methacrylic or any of the crotonic acid isomers, oleic, linoleic or linolenic acids, and the like. The corresponding alkyl esters such as methyl acrylate, or glycerides can likewise be used. Thus, for instance, dicyclopentadiene dicarboxylic acid can be reacted with methacrylic or crotonic acid. An effective reaction can also be obtained by using a monobasic acid containing conjugated double bonds, e.g., sorbic acid.

Generally speaking then, the present invention is useful in making valuable polycarboxylic bicycloheptene derivatives.

Where steric configurations permit, the invention can also be used for making the corresponding lactones, either by carrying out the main reaction in the presence of water or by treating the polycarboxylic bicycloheptene product with water in a separate step. As indicated before, water tends to convert the bicycloheptene ring into a bicycloheptanol ring and the resulting hydroxyl group then tends to form a lactone by internal esterification with one of the carboxyl or carboxylalkyl groups.

The lactones may be used in perfumery and also in the preparation of alkyd resins, in lieu of or in addition to the polycarboxylic acids. Not only do most of the present lactones contain two or more remaining carboxyl groups, but the lactone bridge itself tends to open up when cooked with glycols, thereby becoming converted from an internal ester to an alkyd-type polyester. In some instances, the use of lactones is preferable to the use of the bicycloheptene polycarboxylic acids since the latter contain one residual double bond whereas the lactones are fully saturated and therefore tend to give a more stable product.

It will be understood that variations and modifications of the present invention are possible without departing from the scope or spirit hereof.

What is claimed is:

1. Bicyclo-(2,2,1)-heptene polycarboxylic acid consisting of carbon, hydrogen and oxygen having the general formula

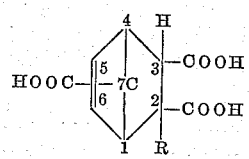

wherein the HOOC— radical is a substituent on the cyclopentene ring formed by carbon atoms numbered 1, 4, 5, 6 and 7, R is a member of the group consisting of hydrogen and —(CH₂)ₙCOOH where $n$ is an integer from 0 to 2, and the remaining valences of the ring carbon atoms are satisfied by members of the group consisting of hydrogen and $C_1$—$C_4$ alkyl radicals.

2. Bicyclo-(2,2,1)-heptene polycarboxylic acid consisting of carbon, hydrogen and oxygen having the general formula

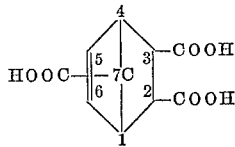

wherein the HOOC— radical is a substituent on the cyclopentene ring formed by carbon atoms numbered 1, 4, 5, 6 and 7, and the remaining valences of the ring carbon atoms are satisfied by hydrogen.

3. Bicyclo-(2,2,1)-heptene polycarboxylic acid consisting of carbon, hydrogen and oxygen having the general formula

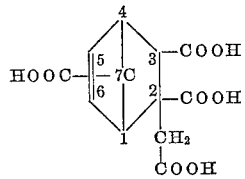

wherein the HOOC-radical is a substituent on the cyclopentene ring formed by carbon atoms numbered 1, 4, 5, 6 and 7, and the remaining valences of the ring carbon atoms are satisfied by hydrogen.

References Cited in the file of this patent

UNITED STATES PATENTS

| | | |
|---|---|---|
| 1,944,731 | Diels et al. | Jan. 23, 1934 |
| 2,345,635 | Stahmann et al. | Apr. 4, 1944 |
| 2,352,606 | Alder et al. | July 4, 1944 |
| 2,415,453 | Thomas | Feb. 11, 1947 |
| 2,450,435 | McGillicuddy | Oct. 5, 1948 |
| 2,454,349 | Schwerdle | Nov. 23, 1948 |
| 2,632,011 | Finch et al. | Mar. 17, 1953 |
| 2,648,652 | Von Schickh | Aug. 11, 1953 |
| 2,716,662 | Cohen et al. | Aug. 30, 1955 |
| 2,731,475 | Hillyer et al. | Jan. 17, 1956 |
| 2,829,147 | Molotsky et al. | Apr. 1, 1958 |
| 2,847,435 | Wiese et al. | Aug. 12, 1958 |
| 2,876,252 | Lotz | Mar. 3, 1959 |
| 2,894,976 | Banes et al. | July 14, 1959 |

OTHER REFERENCES

Alder: Chem. Berichte, vol. 87, pp. 1752–9, 1954. (Available in Sci. Library.)